United States Patent
Seo et al.

(10) Patent No.: US 10,451,843 B2
(45) Date of Patent: Oct. 22, 2019

(54) OPTICAL LENS ASSEMBLY AND ELECTRONIC DEVICE INCLUDING THE SAME

(71) Applicant: Samsung Electronics Co., Ltd., Gyeonggi-do (KR)

(72) Inventors: Jin-seon Seo, Gyeonggi-do (KR); Sung-wook Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 27 days.

(21) Appl. No.: 15/648,554

(22) Filed: Jul. 13, 2017

(65) Prior Publication Data

US 2018/0045918 A1    Feb. 15, 2018

(30) Foreign Application Priority Data

Aug. 12, 2016   (KR) .......................... 10-2016-0103199

(51) Int. Cl.
| | | |
|---|---|---|
| *G02B 13/00* | (2006.01) | |
| *G02B 9/62* | (2006.01) | |
| *G02B 13/14* | (2006.01) | |
| *G02B 9/60* | (2006.01) | |

(52) U.S. Cl.
CPC ........... *G02B 13/0045* (2013.01); *G02B 9/60* (2013.01); *G02B 9/62* (2013.01); *G02B 13/14* (2013.01)

(58) Field of Classification Search
CPC ........ G02B 13/0045; G02B 9/60; G02B 9/62; G02B 13/14

USPC .......................................... 359/761, 770, 781
See application file for complete search history.

(56) References Cited

U.S. PATENT DOCUMENTS

| | | | |
|---|---|---|---|
| 8,792,185 B2 | 7/2014 | Hsu et al. | |
| 9,128,276 B2 | 9/2015 | Chen et al. | |
| 2010/0046094 A1* | 2/2010 | Asami ..................... | G02B 9/62 |
| | | | 359/739 |
| 2015/0131169 A1* | 5/2015 | Asami ................ | G02B 13/0045 |
| | | | 359/713 |
| 2015/0378132 A1 | 12/2015 | Chen et al. | |
| 2018/0024319 A1* | 1/2018 | Lai ......................... | G02B 5/005 |
| | | | 359/739 |
| 2018/0356614 A1* | 12/2018 | Hsueh ................ | G02B 13/0045 |

OTHER PUBLICATIONS

Wikipedia page "Night vision" (Year: 2015).*

* cited by examiner

*Primary Examiner* — George G King
(74) *Attorney, Agent, or Firm* — Cha & Reiter, LLC.

(57) ABSTRACT

Provided are an optical lens assembly and an electronic device. The optical lens assembly includes a first lens having a negative refractive power, a second lens having a positive refractive power, a third lens having a negative refractive power, and a last lens having a negative refractive power. The first lens, the second lens, the third lens, and the last lens may be sequentially arranged from an object side to an image side of an optical axis, the object side facing an object for image capture and the image side facing an image plane of an image sensor.

17 Claims, 11 Drawing Sheets

OPTICAL LENS ASSEMBLY AND ELECTRONIC DEVICE INCLUDING THE SAME

CLAIM OF PRIORITY

This application claims the benefit of Korean Patent Application No. 10-2016-0103199, filed on Aug. 12, 2016, in the Korean Intellectual Property Office, the disclosure of which is incorporated herein in its entirety by reference.

BACKGROUND

1. Field

The present disclosure generally relates to optical lens assemblies and electronic devices including such optical lens assemblies, and more particularly, to optical lens assemblies that are small in size while also having high resolution, and electronic devices including such optical lens assembly.

2. Description of the Related Art

Camera technology has greatly advanced in recent years so that cameras are no longer stand-alone cameras, but rather components of a variety of ubiquitous electronic devices (apparatuses) such as mobile devices, home appliances, or other user devices. With the wide use of these electronic devices, utilization of the camera as a part of these electronic devices is increasing. Accordingly, in response to user demand, camera performance and/or resolution in electronic devices are being improved. Various kinds of landscapes, people, or self-shot pictures or "selfies" may be captured by the camera. In addition, network connectivity of the electronic device allows multimedia, for example, pictures or videos, to be shared on social networks or via other media.

As semiconductors and display technology have improved, camera technology has also improved. Improvements include better resolution and larger sensors, for example, from older electronic devices housing a ⅛" sensor to the latest electronic devices housing a ½" sensor. Improvements in camera technology also allows these electronic device to house telephoto lens and/or super-wide angle lens.

Other advancements include miniaturizing the camera, so that the physical size of the camera as small as possible. However, while doing so, optical performance, for example, maintaining a low F-number and excellent aberration correction, must be maintained. Conventionally, it is difficult to control image aberration in a miniaturized wide angle lens.

SUMMARY

Provided are optical lens assemblies that have relatively wide capture angles and have relatively large apertures.

Provided are optical lens assemblies for use in image sensors capable of recognizing irises of a user.

Additional aspects will be set forth in part in the following description, will be apparent from the description, or may be learned by practicing the presented embodiments.

According to an aspect of an embodiment, an optical lens assembly includes a first lens having a negative refractive power; a second lens having a positive refractive power; a third lens having a negative refractive power; and a last lens having a negative refractive power. The first lens, the second lens, the third lens, and the last lens may be sequentially arranged from an object side to an image side of an optical axis, the object side facing an object for image capture and the image side facing an image plane of an image sensor. The optical lens assembly may satisfy following conditions:

$$f/EPD<1.8$$

$$CT3/OAL<0.055$$

$$LLS/OAL>0.2,$$

where EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on an image side surface of the last lens to the image plane, wherein the point is a point on the image side surface closest to the image plane.

According to an aspect of another embodiment, an electronic device includes an optical lens assembly; an image sensor configured to receive light focused by the optical lens assembly; and a filter configured to transmit an infrared ray (IR). The optical lens assembly includes a first lens having a negative refractive power, a second lens having a positive refractive power, a third lens having a negative refractive power, and a last lens having a negative refractive power. The first lens, the second lens, the third lens, and the last lens may be sequentially arranged from an object side to an image side of an optical axis, the object side facing an object for image capture and the image side facing an image plane of the image sensor. The optical lens assembly may satisfy following conditions:

$$f/EPD<1.8$$

$$CT3/OAL<0.055$$

$$LLS/OAL>0.2,$$

where EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on an image side surface of the last lens to the image plane, wherein the point is a point on the image side surface closest to the image plane.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
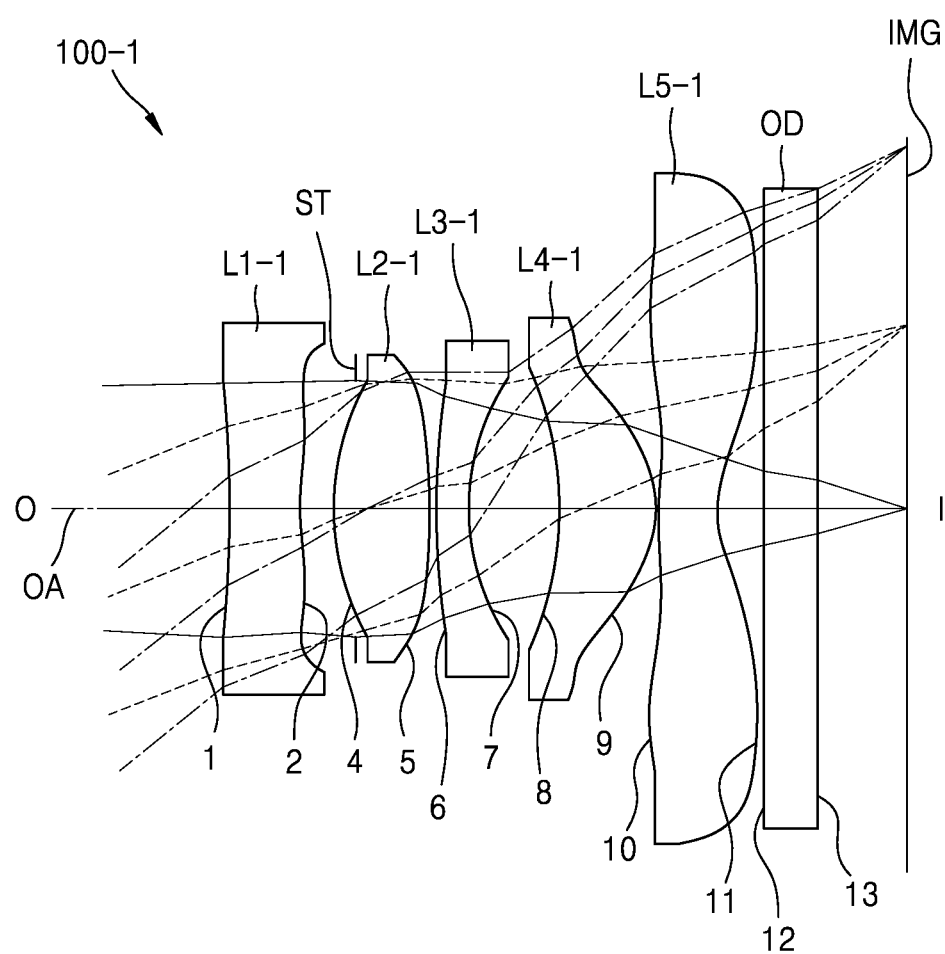
FIG. 1 is a diagram of an optical lens assembly of the first numerical example of the present disclosure.

Hereinafter, one or more embodiments of the present disclosure will be described below with reference to accompanying drawings. However, the techniques disclosed in the present disclosure are not limited to the disclosed embodiments, but it should be appreciated that various modifications, equivalents, and/or alternatives of the embodiments may be implemented. Regarding the description of the drawings, like reference numerals may be used for like components.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B," "at least one of A and/or B," or "one or more of A and/or B" includes any and all combinations of one or more of the associated listed items. For examples, "A or B," "at least one of A and B," "at least one of A or B" each may include (1) at least one A, or include (2) at least one B, or include (3) both at least one A and at least one B.

Ordinal numbers as herein used, such as "first," "second," etc., may modify various components of various example embodiments, but do not limit those components. For example, these terms do not limit the order and/or importance of the components. These terms are only used to distinguish one component from another. For example, a first user device and a second user device are different user devices from each other. For example, according to various example embodiments of the present disclosure, a first component may be denoted a second component, and vice versa without departing from the scope of the present disclosure.

When a component (e.g., a first component) is "(operatively or communicatively) connected to or coupled to" another component (a second component), the component may be directly connected or coupled to the other component, or other component(s) (e.g., a third component) may intervene therebetween. In contrast, when a component (e.g., a first component) is directly "connected to" or "directly coupled to" another component (e.g., a second component), no other intervening components (e.g., a third component) may intervene therebetween.

The expression "configured to" used in the present invention may be exchanged with, for example, "suitable for," "having the capacity to," "designed to," "adapted to," "made to," or "capable of" depending on the context of the disclosure. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms as used in various example embodiments of the present invention are merely for the purpose of describing particular embodiments and are not intended to limit the present invention to the various example embodiments. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various example embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in the present invention. In some cases, even the term defined in the disclosure should not be interpreted to exclude embodiments of the disclosure.

An electronic device according to various example embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various example embodiments, the wearable device may include, for example, at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like.

According to some example embodiments, the electronic device may, for example, be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another example embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some example embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter). The electronic device according to various example embodiments of the disclosure may, for example, be a combination of one or more of the aforementioned various devices. The electronic device according to some example embodiments of the disclosure may be a flexible device, or the like. Further, the electronic device according to an example embodiment of the disclosure is not limited to the aforementioned devices, and may include a new electronic device according to the development of technology.

An electronic device according to various example embodiments will be described with reference to the accompanying drawings. As used herein, the term "user" may indicate a person who uses an electronic device or a device (e.g., an artificial intelligence electronic device) that uses an electronic device.

As used herein, the term "and/or" includes any and all combinations of one or more of the associated listed items. Expressions such as "at least one of," when preceding a list of elements, modify the entire list of elements and do not modify the individual elements of the list.

Hereinafter, an optical lens assembly and a device including the optical lens assembly according to various example embodiments will be described with reference to accompanying drawings.

FIG. 1 is a diagram of an optical lens assembly 100-1 of the first numerical example of the present disclosure. The optical lens assembly 100-1 according to the first numerical example may include a first lens L1-1 having a negative refractive power, a second lens L2-1 having a positive refractive power, a third lens L3-1 having a negative refractive power, and a last lens L5-1 that is closest to the image side I, the lenses disposed along the optical axis OA from the object side O towards the image side I. The last lens L5-1 may have a negative refractive power.

Hereinafter, when components of each lens are described, the image side I may denote the side towards the image plane IMG in which the image is focused and the object side O may denote the side towards the object whose image is to be captured. In addition, "object side surface" of a lens denotes the lens surface closer to the object, that is, the left surface on the drawings, and an "image side surface" of the lens denotes the lens surface closer to the image plane IMG, that is, the right surface on the drawings. The image plane IMG may be, for example, an imaging device surface or an image sensor surface. An image sensor may be, for example, a sensor such as a complementary metal oxide semiconductor (CMOS) image sensor or a charge coupled device (CCD). The image sensor is not limited thereto and may be, for example, any device that converts an image of an object into an electric image signal.

According to one exemplary embodiment, the first lens L1-1 may have an object side surface 1 and an image side surface 2, one of which may be a flat surface. For example, the object side surface 1 of the first lens L1-1 may be a flat surface. In addition, the image side surface 2 of the first lens L1-1 may be concave towards the image side I.

The second lens L2-1 may have an object side surface 4 that is convex towards the object side O. The second lens L2-1 may have an image side surface 5 that is convex towards the image side I. The second lens L2-1 may be, for example, a biconvex lens. The third lens L3-1 may have an object side surface 6 that is convex towards the object side O. The third lens L3-1 may include an image side surface 7 that is concave towards the image side I. For example, the third lens L3-1 may be a meniscus lens that is convex towards the object side O.

The last lens L5-1 may have at least one inflection point in either the object side surface 10 or the image side surface 11. An inflection point may refer to a point at which the sign of the radius of curvature of the lens surface changes from positive (+) to negative (−), or from negative (−) to positive (+). Alternatively, the inflection point may refer to a point at which the shape of the lens changes from convex to concave, or from concave to convex. The last lens L5-1 may have an object side surface 10 that is centrally convex toward the object side O, i.e. the object side surface 10 is convex towards the object side O in a region adjacent to the optical axis OA. A region adjacent to the optical axis may denote a region within a predetermined range from the optical axis OA. The last lens L5-1 may have an image side surface 11 that is concave toward the image side I in the region adjacent to the optical axis OA.

A fourth lens L4-1 may be further disposed between the third lens L3-1 and the last lens L5-1. The fourth lens L4-1 may have a positive refractive power. The fourth lens L4-1 may have an object side surface 8 that is concave towards the object side O. The fourth lens L4-1 may include an image side surface 9 that is convex towards the image side I. The fourth lens L4-1 may be a meniscus lens that is concave towards the object side O.

The optical lens assembly 100-1 according to the first numerical example may include an aperture stop ST. The aperture stop ST may adjust the aperture of the camera, and may include, for example, an opening stop, a variable stop, or a mask type stop. The aperture stop ST may be disposed, for example, between the first lens L1-1 and the second lens L2-1. However, location of the aperture stop is not limited to the above example, and the aperture stop ST may be disposed, for example, at the object side O of the first lens L1-1 or between the second lens L2-1 and the third lens L3-1.

The optical lens assembly 100-1 according to the first numerical example may include at least one aspherical lens. For example, the first lens L1-1, the second lens L2-1, the third lens L3-1, the fourth lens L4-1, and the last lens L5-1 may each include at least one aspherical surface. As another example, the first lens L1-1, the second lens L2-1, the fourth lens L4-1, and the last lens L5-1 may each include double aspherical surfaces, and the third lens L3-1 may include a single aspherical surface.

At least one optical device OD may be disposed between the last lens L5-1 and the image plane IMG. The optical device OD may be, for example, an infrared ray (IR) cut-off filter, an IR transmission filter, cover glass for the sensor, etc. When the optical device is an IR transmission filter, visible light may be blocked so that visible light is not transmitted to the sensor. Instead, IR may be transmitted to the image plane IMG. The IR transmission filter may include a material for absorbing visible light or may be manufactured by coating a material blocking visible light on a glass plate.

Figure 3:
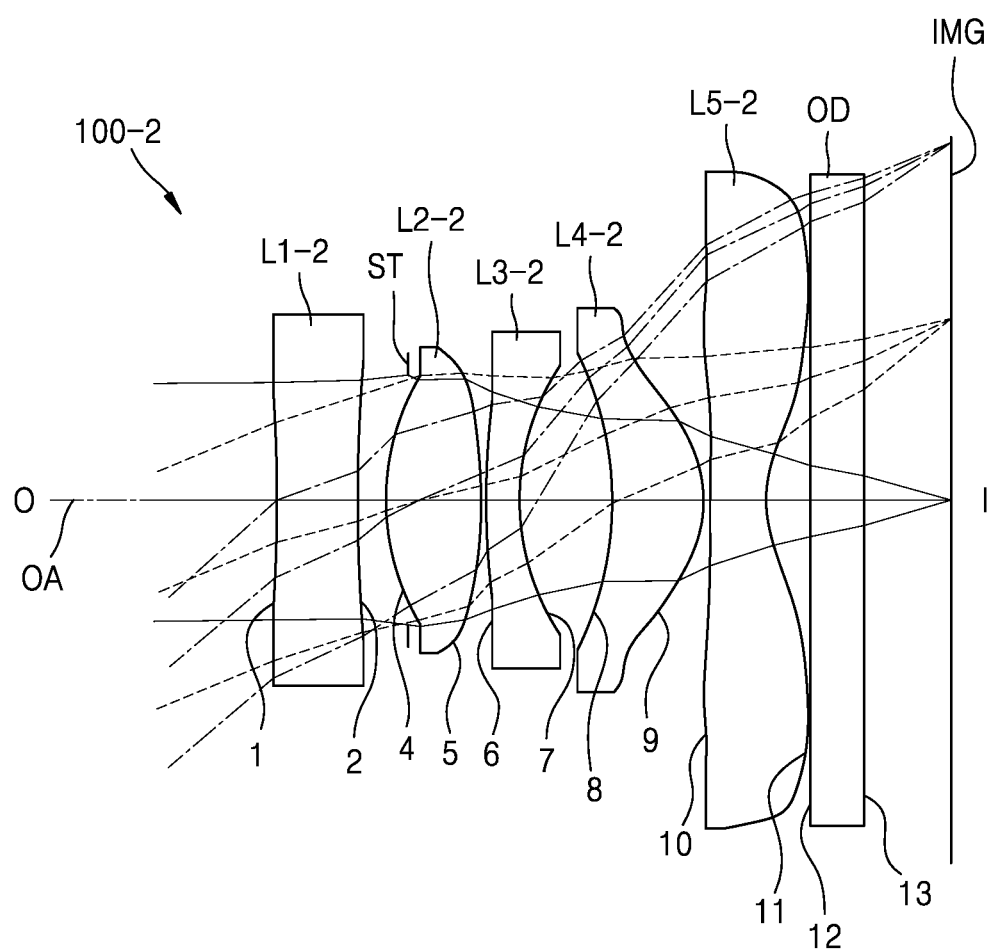
FIG. 3 is a diagram of an optical lens assembly of the second numerical example of the present disclosure.

FIG. 3 is a diagram of an optical lens assembly 100-2 of the second numerical example of the present disclosure.

The optical lens assembly 100-2 according to the second numerical example may include a first lens L1-2 having a negative refractive power, a second lens L2-2 having a positive refractive power, a third lens L3-2 having a negative refractive power, and a last lens L5-2 having a negative refractive power, wherein the above lenses are arranged from the object side O to the image side I. A fourth lens L4-2 having a positive refractive power may be disposed between the third lens L3-2 and the last lens L5-2. In the the second numerical example, descriptions about components similar to those of the first numerical example will be omitted.

Figure 5:
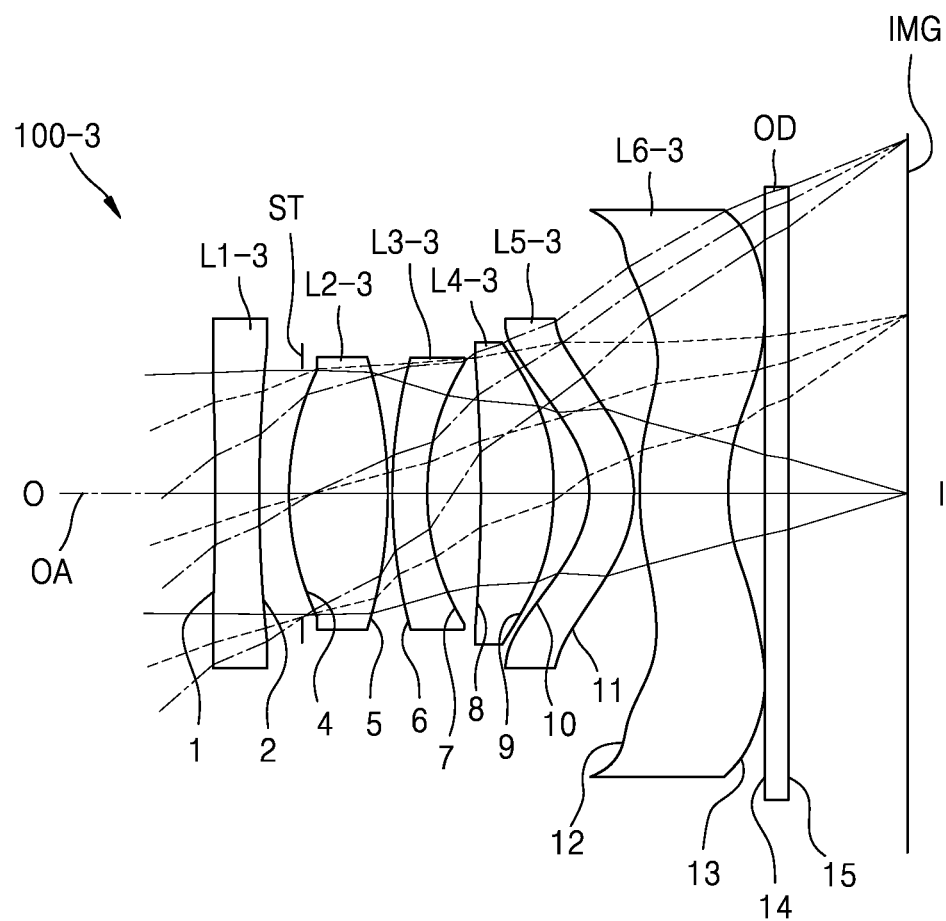
FIG. 5 is a diagram of an optical lens assembly of the third numerical example of the present disclosure.

FIG. 5 is a diagram of an optical lens assembly 100-3 of a third numerical example of the present disclosure.

The optical lens assembly 100-3 according to the third numerical example may include a first lens L1-3 having a negative refractive power, a second lens L2-3 having a positive refractive power, a third lens L3-3 having a negative refractive power, and a last lens L6-3 having a negative refractive power, wherein the above lenses are arranged from the object side O to the image side I. A fourth lens L4-3 having a positive refractive power and a fifth lens L5-3 having a positive refractive power may be disposed between the third lens L3-3 and the last lens L6-3. The fourth lens L4-3 may have an object side surface 8 that is concave towards the object side O. The fourth lens L4-3 may have an image side surface 9 that is convex towards the image side I. The fourth lens L4-3 may be a meniscus lens that is convex towards the image side I. The fifth lens L5-3 may have an object side surface 10 that is concave towards the object side O. The fifth lens L5-3 may have an image side surface 11 that is convex towards the image side I. The fifth lens L5-3 may be a meniscus lens that is convex towards the image side I. In the third numerical example, descriptions about components similar to those of the first numerical example will be omitted.

Figure 7:
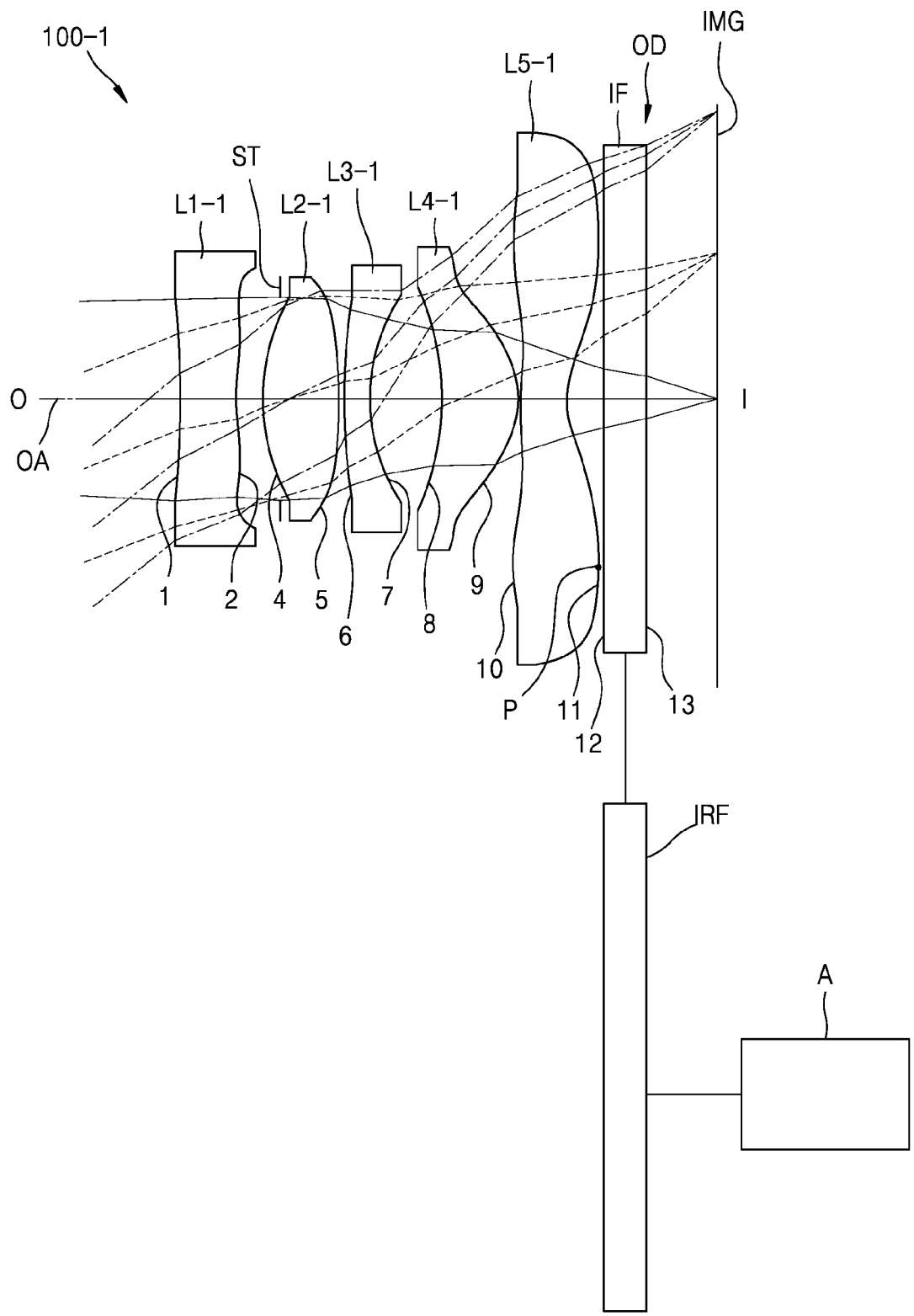
FIG. 7 is a diagram showing an example of an optical lens assembly according to one example embodiment that includes a replaceable infrared ray (IR) cut-off filter and IR transmission filter.

FIG. 7 is a diagram showing an example of an optical lens assembly that includes a replaceable IR cut-off filter IF and IR transmission filter IRF.

The IR cut-off filter IF and the IR transmission filter IRF may be swapped depending on the shooting mode of the camera. For example, the IR cut-off filter IF and the IR transmission filter IRF may be moved by an actuator A. The actuator A may move the IR cut-off filter IF and the IR transmission filter IRF in a direction perpendicular to the optical axis OA. When the IR transmission filter IRF is used, for example, photographing of irises for iris authentication of a user may be performed by the optical lens assembly. Alternatively, when the IR cut-off filter IF is used, the camera may capture visible images.

If visible light is not blocked when capturing images of irises of the user, reflectivity of the visible light from corneas of the eyes cause precision errors in the image of irises. Therefore, when images of irises are to be captured for the iris authentication, the IR transmission filter IRF is moved to be between the last lens L5-1 and the image plane IMG to block or absorb visible light, including the visible light reflected from corneas.

The optical lens assembly according to one exemplary embodiment may satisfy following conditions. Conditions below will be described with reference to the optical lens assembly 100-1 according to the first numerical example shown in FIG. 1. However, the following conditions may be applied to the other exemplary embodiments.

$$f/EPD<1.8 \quad (1)$$

$$CT3/OAL<0.055 \quad (2)$$

$$LLS/OAL>0.2 \quad (3)$$

Here, EPD denotes the diameter of the entrance pupil of the aperture stop (ST), f denotes the focal length of the optical lens assembly, CT3 denotes the thickness of the third lens L3-1 at the optical axis OA, OAL denotes the entire length of the optical lens assembly, and LLS denotes the distance from a point on the image side surface 11 of the last lens L5-1 closest to the image side I, to the image plane IMG. The entire length of the optical lens assembly denotes the distance on the optical axis OA from the object side surface 1 of the first lens L1-1 to the image plane IMG. As shown in FIG. 7, LLS denotes the distance from a peak P on the image side surface 11 of the last lens L5-1 to the image sensor IMG.

The above condition 1 represents a ratio between the focal length and the entrance pupil diameter of the optical lens assembly according to one embodiment. This ratio is also known in the art as the f-number.

When the value of (CT3/OAL) is greater than 0.055, for example, the thickness of the third lens is too great to miniaturize the optical lens assembly. When a value of (LLS/OAL) is less than 0.2, for example, there may be insufficient flange back length such that there is not enough space to allow the placement of the IR cut-off filter and/or the IR transmission filter. The optical lens assembly according to one embodiment may have a flange back length ranging from 0.8 mm to 1.2 mm. Exceeding 1.2 mm may be undesirable as it may cause the optical lens assembly to be unnecessarily large.

When the optical lens assembly satisfies Conditions 1, 2, and 3, lens flares are reduced and lens sensitivity is reduced to improve aberration characteristics.

The optical lens assembly according to the one embodiment may also satisfy following condition.

$$V4-V3>30 \quad (4)$$

Here, V3 denotes an Abbe's number of the third lens, and V4 denotes an Abbe's number of the fourth lens. When the value of (V4−V3) satisfies Conditions 4, chromatic aberration may be reduced.

The optical lens assembly according to the one embodiment may also satisfy following condition.

$$-3<f3/f2<-1 \quad (5)$$

Here, f2 denotes a focal length of the second lens, and f3 denotes a focal length of the third lens. When the value of (f3/f2) is less than −3, the focal length of the third lens may be excessively reduced in order to increase sensitivity of the third lens. Accordingly, it may be difficult to manufacture the lens assembly with the appropriate aberration characteristics. When the value of (f3/f2) is greater than −1, the thickness of the second lens may be too great, and thus the optical lens assembly may not unnecessarily large.

The optical lens assembly according to the one embodiment may also satisfy following condition.

$$-2<f3/f<-0.8 \quad (6)$$

Here, f3 denotes a focal length of the third lens.

When the value of (f3/f) is less than −2, the focal length of the lens assembly may be too large to implement wide angle image capture. When a value of (f3/f) is greater than −0.8, it may be difficult to miniaturize the optical lens assembly.

According to one embodiment, the space between the second lens and the third lens may be equal to or less than 0.1 mm. As described above, the distance between the second lens and the third lens may be reduced so as to miniaturize the optical lens assembly.

The aspherical surfaces used in the optical lens assembly according to various exemplary embodiments may be defined as follows.

The aspherical surface shape of an aspherical lens may be defined by following equation, where the optical axis OA is the x-axis, a direction perpendicular to the optical axis OA is the y-axis, and the light ray entering the lens assembly proceeds in the positive x-direction. Here, x denotes a distance from the vertex of the aspherical lens along the optical axis OA, y denotes the distance in the direction perpendicular to the optical axis OA, K denotes a conic constant, A, B, C, D, . . . denote aspherical coefficients, and c denotes a reciprocal number of the radius of curvature (1/R) at the vertex of the lens.

$$x = \frac{cy^2}{1 + \sqrt{1 - (K+1)c^2 y^2}} + Ay^4 + By^6 + Cy^8 + Dy^{10} + \ldots \quad (7)$$

Various numerical values of the optical lens assembly may be adjusted according to various designs as follows.

In each of the numerical examples, the lens surfaces (1, 2, 3 . . . n, where n is a natural integer) are numbered sequentially from the object side O to the image side I. f-number denotes the focal length of the optical lens assembly, R denotes the radius of curvature, Dn denotes the thickness of the lens or the air space between lenses, Nd denotes the refractive index, Vd denotes the Abbe's number, and IMG denotes the image plane (or the image sensor surface). ST denotes the aperture stop, and obj denotes an object. * denotes that the surface is an aspherical surface.

FIRST NUMERICAL EXAMPLE

FIG. 1 is a diagram of an optical lens assembly of the first numerical example, and Table 1 shows the design data for the first numerical example.

f-number is 1.77, half field of view is approximately 40 degrees, and the effective focal length (f) of the optical lens assembly is approximately 2.57 mm.

TABLE 1

| lens surface | R | Dn | Nd | Vd |
| --- | --- | --- | --- | --- |
| obj | infinity | infinity | | |
| 1* | infinity | 0.436 | 1.5448 | 56.05 |
| 2* | 5.188 | 0.323 | | |
| ST | infinity | −0.13 | | |
| 4* | 1.176 | 0.57 | 1.5448 | 56.05 |
| 5* | −3.29 | 0.025 | | |
| 6* | 3.954 | 0.2 | 1.63972 | 23.52 |
| 7 | 1.462 | 0.54 | | |
| 8* | −2.019 | 0.558 | 1.5448 | 56.05 |
| 9* | −0.571 | 0.025 | | |
| 10* | 4.521 | 0.34 | 1.5448 | 56.05 |
| 11* | 0.58 | 0.279 | | |
| 12 | infinity | 0.32 | 1.5168 | 64.2 |
| 13 | infinity | 0.5309 | | |
| IMG | infinity | 0 | | |

Table 2 illustrate aspherical coefficients in the first numerical example.

TABLE 2

| | lens surface | | | | |
| --- | --- | --- | --- | --- | --- |
| | 1 | 2 | 4 | 5 | 6 |
| k | 0 | 0 | −0.882221107 | −3.121251873 | 0 |
| A | −0.120864389 | −0.434871782 | −0.39298463 | −0.026628879 | −0.006658106 |
| B | 0.044009793 | 0.830064593 | 2.24895078 | −1.627725892 | −0.75063441 |
| C | 0.562780228 | 1.10017326 | −18.87050401 | 12.79091141 | 3.548966939 |
| D | −1.991156117 | −15.27714427 | 107.8844751 | −62.36233713 | −7.217543263 |
| E | 3.681797271 | 59.14639333 | −385.6033369 | 200.5888279 | 1.832366772 |
| F | −4.040634724 | −124.0668707 | 860.0948278 | −420.202348 | 18.91866721 |
| G | 2.624085191 | 149.9094862 | −1167.259025 | 546.1770783 | −34.85569703 |
| H | −0.930144336 | −98.03345939 | 882.9519303 | −397.6090541 | 25.23825752 |
| J | 0.138274077 | 26.98551687 | −285.8626377 | 123.3218402 | −6.768869494 |

| | lens surface | | | |
| --- | --- | --- | --- | --- |
| | 8 | 9 | 10 | 11 |
| k | 0 | −6.18082836 | 3.135656941 | −5.926118676 |
| A | −0.043221787 | −1.515481844 | −0.532794435 | −0.298181401 |
| B | −0.465350436 | 7.667730336 | 0.931193662 | 0.44768731 |
| C | 1.734367196 | −30.68849364 | −1.264194021 | −0.524126357 |
| D | −4.97992594 | 84.63073419 | 1.350340121 | 0.42994465 |
| E | 13.08410323 | −156.3603438 | −1.034329435 | −0.240852615 |
| F | −18.36279043 | 189.889622 | 0.534950465 | 0.089443712 |
| G | 12.23441959 | −143.3290289 | −0.176032477 | −0.020949122 |
| H | −3.196718867 | 60.34770407 | 0.03313172 | 0.002800061 |
| J | 0 | −10.78021256 | −0.002708752 | −0.000163266 |

Figure 2:
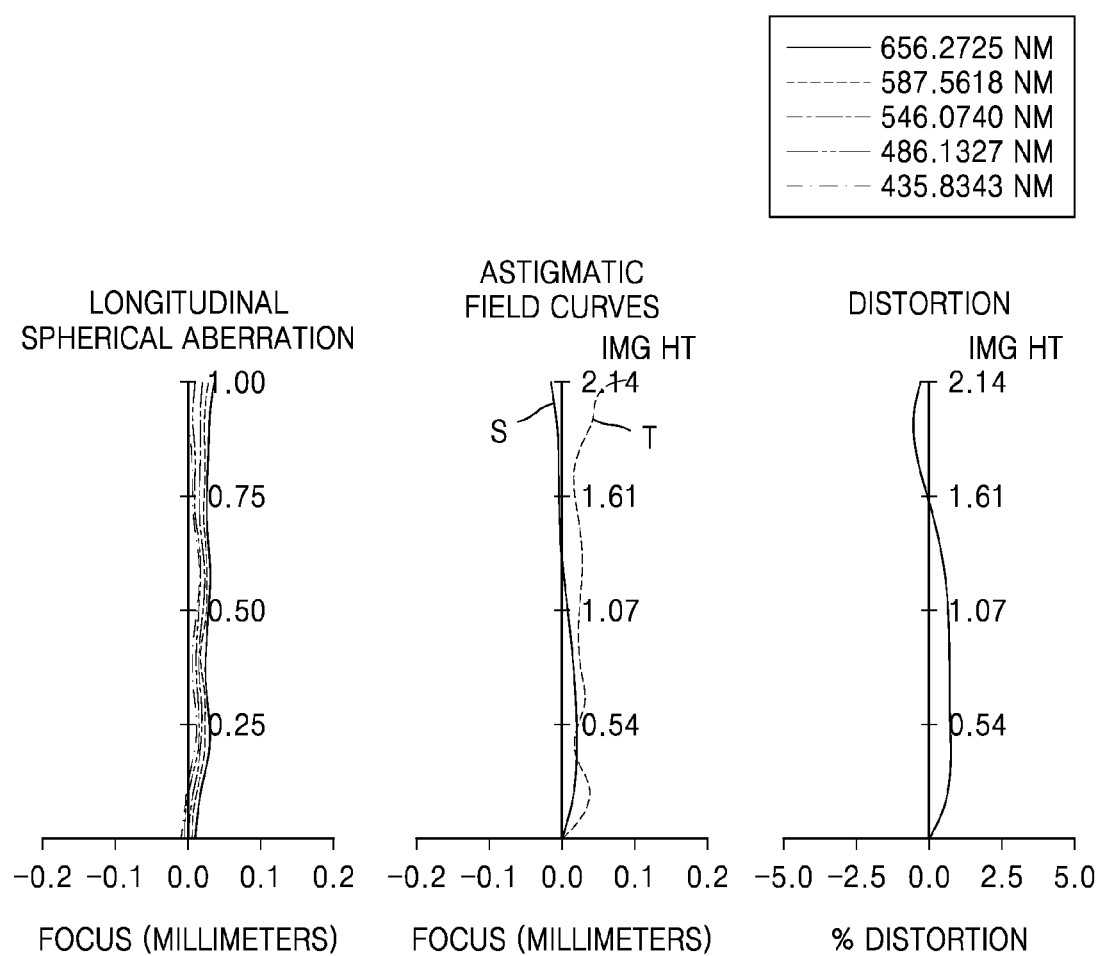
FIG. 2 is an aberration diagram of the optical lens assembly of the first numerical example of the present disclosure.

FIG. 2 shows the longitudinal spherical aberration, the astigmatic field curves, and the distortion of the optical lens assembly according to the first numerical example of the present disclosure. The longitudinal spherical aberration is shown with respect to light at the wavelengths of 656.2725 NM (nanometer), 587.5618 NM, 546.07400 NM, 486.2437 NM, and 435.8343 NM. The tangential field curvature (T) and the sagittal field curvature (S) are shown in the astigmatic field curves. The astigmatic field curves are shown with respect to light at the wavelength of 587.5618 NM, and the distortion is shown with respect to light at the wavelength of 587.5618 NM.

SECOND NUMERICAL EXAMPLE

FIG. 3 shows an optical lens assembly of the second numerical example, and Table 3 shows the design data for the second numerical example.

f-number is 1.77, half field of view is 40 degrees, and the effective focal length (f) of the optical lens assembly is 2.5 mm.

TABLE 3

| lens surface | R | Dn | Nd | Vd |
| --- | --- | --- | --- | --- |
| obj | infinity | infinity | | |
| 1* | infinity | 0.475 | 1.5448 | 56.05 |
| 2* | 4.998 | 0.308 | | |
| ST | infinity | −0.13 | | |
| 4* | 1.139 | 0.562 | 1.5448 | 56.05 |
| 5* | −3.268 | 0.025 | | |
| 6* | 4.342 | 0.2 | 1.63972 | 23.52 |
| 7 | 1.462 | 0.54 | | |
| 8* | −2.019 | 0.558 | 1.5448 | 56.05 |
| 9* | −0.571 | 0.025 | | |
| 10* | 3.976 | 0.341 | 1.5448 | 56.05 |
| 11* | 0.58 | 0.257 | | |
| 12 | infinity | 0.33 | 1.5168 | 64.2 |
| 13 | infinity | 0.51 | | |
| IMG | infinity | 0 | | |

Table 4 illustrate aspherical coefficients in the second numerical example.

TABLE 4

| | lens surface | | | | |
| --- | --- | --- | --- | --- | --- |
| | 1 | 2 | 4 | 5 | 6 |
| k | 0 | 0 | −0.885643473 | −3.204409128 | 0 |
| A | −0.090164107 | −0.390753084 | −0.36364479 | −0.025654748 | −0.046075572 |
| B | 0.013605078 | 0.210490962 | 1.279135352 | −1.419730925 | 0.056085558 |
| C | 0.378689763 | 6.503072125 | −7.831679985 | 10.35840038 | −4.586040109 |
| D | −1.012204898 | −43.15082046 | 41.43851016 | −45.6136814 | 40.91596869 |
| E | 1.415387113 | 148.8035799 | −145.652801 | 128.2737197 | −177.6437825 |
| F | −1.094807662 | −305.5670979 | 321.7372032 | −230.7770068 | 440.4871781 |
| G | 0.405256515 | 373.8740318 | −430.8108499 | 255.4477096 | −636.7399937 |
| H | −0.024110342 | −251.5163493 | 319.6009991 | −157.4967178 | 500.7978193 |
| J | −0.017089044 | 71.69692671 | −101.1274401 | 40.82407651 | −165.9719091 |

| | lens surface | | | |
| --- | --- | --- | --- | --- |
| | 8 | 9 | 10 | 11 |
| k | 0 | −6.18082836 | 3.316851548 | −5.827272075 |
| A | −0.043221787 | −1.515481844 | −0.51536832 | −0.299415707 |
| B | −0.465350436 | 7.667730336 | 0.892980365 | 0.471822376 |
| C | 1.734367196 | −30.68849364 | −1.216638787 | −0.584513552 |
| D | −4.97992594 | 84.63073419 | 1.335038884 | 0.514552915 |
| E | 13.08410323 | −156.3603438 | −1.080279942 | −0.312248805 |
| F | −18.36279043 | 189.889622 | 0.601057367 | 0.126326232 |
| G | 12.23441959 | −143.3290289 | −0.214757048 | −0.032314339 |
| H | −3.196718867 | 60.34770407 | 0.044028423 | 0.004711768 |
| J | 0 | −10.78021256 | −0.003919356 | −0.000298245 |

Figure 4:
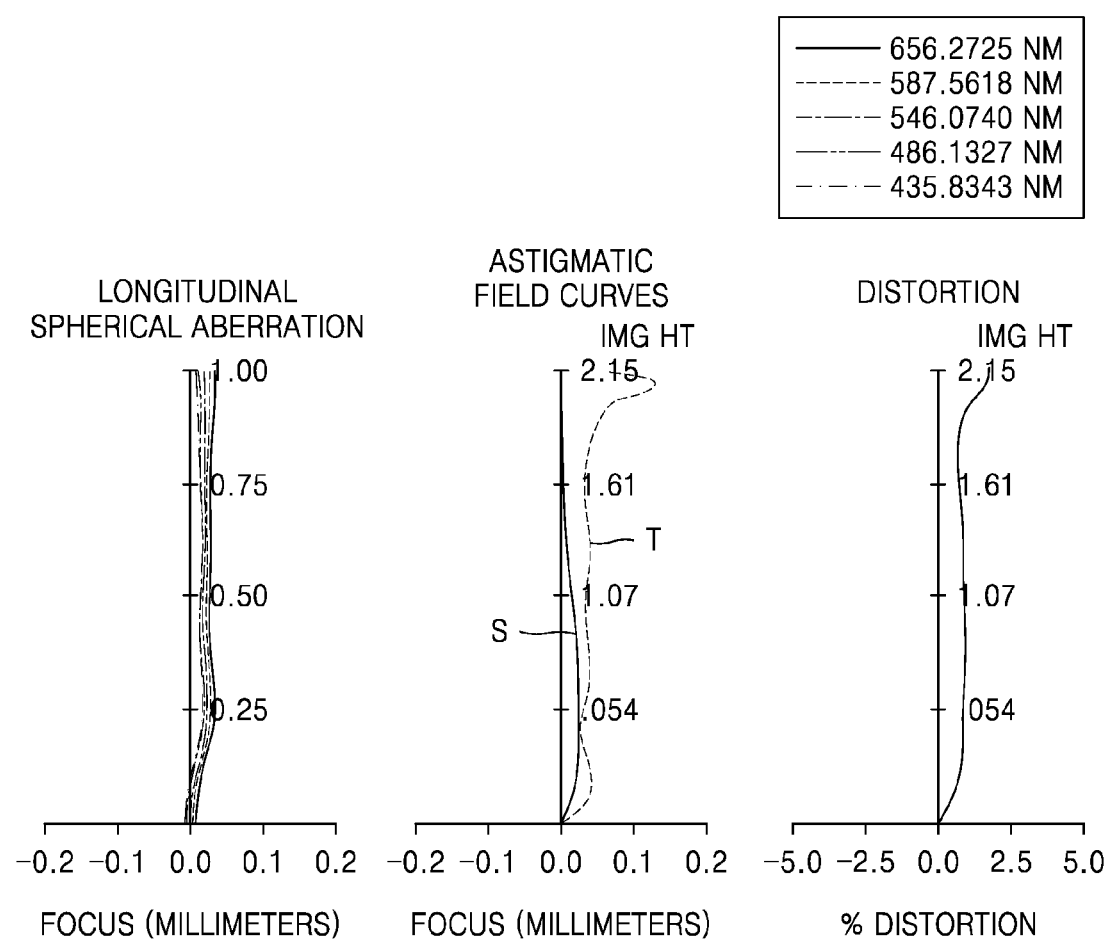
FIG. 4 is an aberration diagram of the optical lens assembly of the second numerical example of the present disclosure.

FIG. 4 shows the longitudinal spherical aberration, the astigmatic field curves, and the distortion of the optical lens assembly according to the second numerical example of the present disclosure.

THIRD NUMERICAL EXAMPLE

FIG. 5 shows an optical lens assembly of the third numerical example, and Table 5 shows the design data for the third numerical example.

f-number is 1.76, half field of view is 39.6 degrees, and the effective focal length (f) of the optical lens assembly is 2.55 mm.

TABLE 5

| lens surface | R | Dn | Nd | Vd |
| --- | --- | --- | --- | --- |
| obj | infinity | infinity | | |
| 1* | −25.252 | 0.258 | 1.5441 | 56.09 |
| 2* | 7.009 | 0.25 | | |
| ST | infinity | −0.079 | | |
| 4* | 1.457 | 0.585 | 1.5441 | 56.09 |
| 5* | −3.782 | 0.025 | | |
| 6* | 2.26 | 0.207 | 1.65038 | 21.52 |
| 7* | 1.268 | 0.329 | | |
| 8* | −500 | 0.418 | 1.5441 | 56.09 |
| 9* | −1.953 | 0.213 | | |
| 10* | −0.547 | 0.271 | 1.65038 | 21.52 |
| 11* | −0.649 | 0.025 | | |
| 12* | 1.381 | 0.529 | 1.5348 | 55.71 |
| 13* | 0.983 | 0.223 | | |
| 14 | infinity | 0.142 | 1.5168 | 64.2 |
| 15 | infinity | 0.703 | | |
| IMG | infinity | 0 | | |

Table 6 illustrate aspherical coefficients in the third numerical example.

TABLE 6

| | _____ aspherical coefficients _____ | | | | | |
|---|---|---|---|---|---|---|
| | 1 | 2 | 4 | 5 | 6 | 7 |
| k | 0 | 0 | −0.890088269 | −227.6024653 | −0.458974641 | −8.439082258 |
| A | −0.063109375 | −0.177472658 | −0.130144075 | −0.398984316 | −0.143410862 | 0.191169221 |
| B | 0.05824286 | 0.211048904 | 0.146600382 | 1.453199196 | −0.352163083 | −0.412868056 |
| C | 0.062987192 | 0.025596129 | −0.127237687 | −6.051887755 | 2.250341826 | 0.740963997 |
| D | −0.204234637 | −0.178830828 | −2.106855696 | 16.2680503 | −6.742274128 | −0.49441815 |
| E | 0.262854686 | −0.102049007 | 8.647610755 | −27.53115934 | 12.8111951 | 0.044235924 |
| F | −0.172614924 | 0.507653337 | −13.78132494 | 28.59088365 | −13.31632796 | 0.168040104 |
| G | 0.054270428 | −0.307690586 | 7.877381376 | −17.47394254 | 5.649760182 | 0 |
| H | −0.006459795 | 0 | 0 | 5.164732533 | 0 | 0 |
| J | 0 | 0 | 0 | 0 | 0 | 0 |

| | _____ aspherical coefficients _____ | | | | | |
|---|---|---|---|---|---|---|
| | 8 | 9 | 10 | 11 | 12 | 13 |
| k | 0.00E+00 | 1.042593219 | −1.875630227 | −0.69940541 | −20.32553299 | −8.455243416 |
| A | −0.202025722 | −0.321010151 | −0.357749865 | 0.293021938 | 0.195778013 | 0.046944544 |
| B | 0.299115085 | 0.014808152 | 1.462311519 | 1.321703045 | −0.679941295 | −0.179383957 |
| C | −1.70301562 | 2.409532092 | −0.108512138 | −3.200900142 | 0.691277598 | 0.135035532 |
| D | 5.661161437 | −6.811754679 | −8.04721074 | 3.659886245 | −0.440888998 | −0.057518695 |
| E | −11.48325642 | 8.146891651 | 17.05178564 | −2.055649823 | 0.187785282 | 0.013952568 |
| F | 12.04686267 | −4.231131747 | −14.13131038 | 0.575432746 | −0.045018201 | −0.001752998 |
| G | −4.443239625 | 0.752398149 | 4.252532202 | −0.052326846 | 0.004361408 | 8.59E−05 |
| H | 0 | 0 | 0 | 0 | 0 | 0 |
| J | 0 | 0 | 0 | 0 | 0 | 0 |

Figure 6:
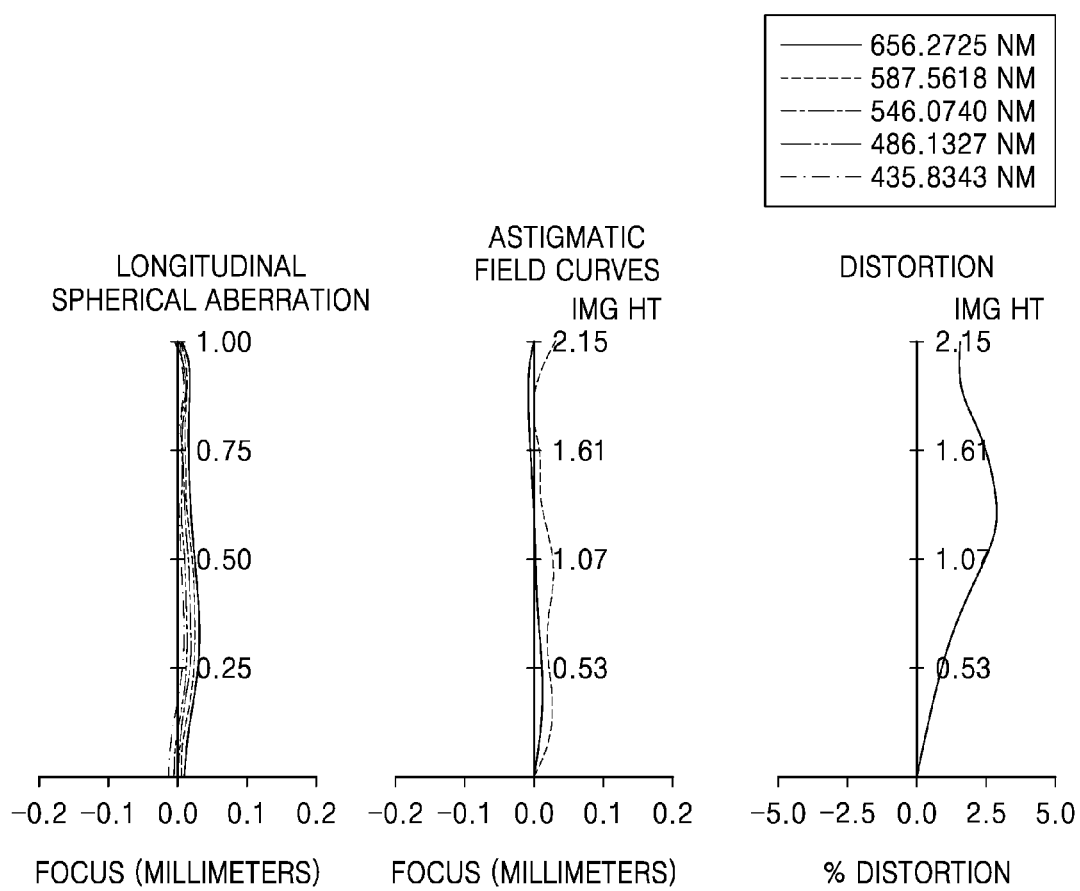
FIG. 6 is an aberration diagram of the optical lens assembly of the third numerical example of the present disclosure.

FIG. 6 shows the longitudinal spherical aberration, the astigmatic field curves, and the distortion of the optical lens assembly according to the third numerical example of the present disclosure.

The optical lens assembly according to various exemplary embodiments satisfies Conditions 1 to 6 as follows.

TABLE 7

| | f | f1 | f2 | f3 | f4 | f5 | f6 | half field of view | OAL | F-No | CT3 | LLS | V4-V3 | CT3/OAL | LLS/OAL | f3/f2 | f3/f |
|---|---|---|---|---|---|---|---|---|---|---|---|---|---|---|---|---|---|
| First Example embodiment | 2.568 | −9.48 | 1.66 | −3.71 | 1.28 | −1.26 | | 39.8 | 4.02 | 1.77 | 0.2 | 0.85 | 32.53 | 0.05 | 0.211 | −2.23 | −1.44 |
| Second example embodiment | 2.5 | −9.14 | 1.62 | −3.51 | 1.28 | −1.29 | | 40 | 3.99 | 1.76 | 0.2 | 0.84 | 32.53 | 0.05 | 0.21 | −2.17 | −1.40 |
| Third example embodiment | 2.55 | −10 | 2 | −4.8 | 3.59 | 84.1 | −11.8 | 39.6 | 4.1 | 1.76 | 0.21 | 0.845 | 34.57 | 0.051 | 0.206 | −2.40 | −1.88 |

The optical lens assembly according to various exemplary embodiments disclosed above may be used in, for example, electronic devices such as mobile devices. The optical lens assembly of the present disclosure may also be used in various electronic devices such as digital cameras, camera with replaceable lenses, video cameras, cellphone cameras, cameras for small mobile devices, etc.

Figure 8:
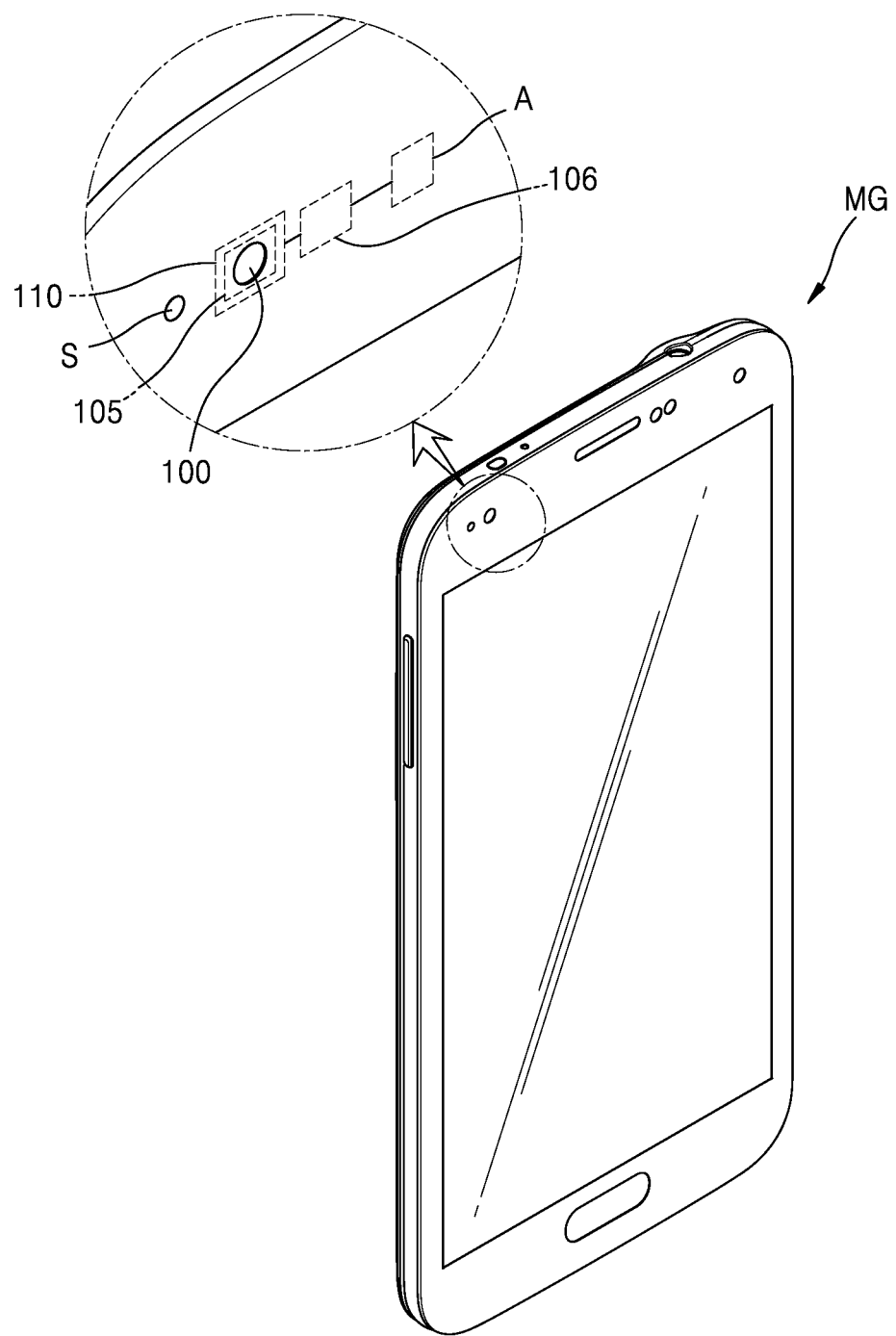
FIG. 8 is a diagram showing an example of an electronic apparatus including an optical lens assembly according to one exemplary embodiment of the present disclosure.

FIG. 8 is a diagram showing an example of an electronic device MG including an optical lens assembly according to an exemplary embodiment. FIG. 8 shows an example where the electronic device MG is a mobile phone, but the present disclosure is not limited thereto. The electronic device MG may include at least one optical lens assembly 100, and an image sensor 110 receiving an image captured by the optical lens assembly 100. The image sensor 110 may also convert the image into electric image signals. In addition, the optical lens assembly 100 may include an IR cut-off filter 105 between the image plane IMG and the last lens closest to the image place IMG. Also, the optical lens assembly may include an IR transmission filter 106 that can be actuated to replace the IR cut-off filter 105. The IR cut-off filter 105 and the IR transmission filter 106 may be moved by the actuator A.

The optical lens assembly 100 may be one of the optical lens assemblies described above with reference to FIGS. 1 to 7. When the optical lens assembly according to present disclosure is used for small digital cameras such as cameras used in mobile devices, the digital camera may be miniaturized while the high performance of the camera may be maintained.

In addition, the image sensor 110 may further include pixels that are sensitive to IR. IR sensing pixels may allow IR photography. A color filter included in the image sensor may transmit light having wavelengths in the IR band, as well as visible light in the red, green, and blue bands. In this case, when the camera is in the shooting mode for visible light photography, the light in the IR band may generate noise in the images. Therefore, IR light may be blocked by an additional filter, such as the IR cut-off filter disclosed above. Furthermore, another shooting mode of the camera may be for IR photography only. In this shooting mode, the IR cut-off filter is not appropriate. Rather, a IR transmission filter is required. According to one or more embodiments of the present disclosure, the IR cut-off filter and the IR transmission filter can be moved by actuator A so that they can be swapped out for each other. Therefore, the IR cut-off filter or the IR transmission filter may be moved out of the optical path, as required by the current shooting mode of the camera. When the camera is used to capture only visible light, IR light may be blocked by the IR cut-off filter. Alternatively, IR noise may be removed by using digital signal processing when the IR cut-off filter is not used. In addition, when the camera is used to capture only IR light, the IR cut-off filter is moved out of the optical path and the IR transmission filter is moved within the optical path. Thus, an IR image may be obtained by using the IR sensing pixels.

When iris authentication of a user is performed, a user interface for guiding the user authentication may be displayed on a display screen of the electronic device MG. The electronic device MG may include an IR light source S. The IR light source S may be disposed adjacent to the optical lens assembly 100. IR irradiated from the IR light source S is reflected by eyes of the user and may be focused on the image plane IMG via the optical lens assembly 100. The electronic device MG may obtain the iris image precisely by using the IR transmission filter and the IR light source.

The optical lens assembly may be used in user authentication via iris recognition method disclosed above. Iris recognition is one of biometric techniques used for user authentication, based on the fact that users have unique iris patterns. When used for iris recognition, the viewing angle and/or focal length of the optical lens assembly have to be wide enough or long enough to ensure photography of both eyes of the user at arm's length of the user. Doing so allows the electronic device to perform iris recognition during normal operations of the electronic device. Accordingly, the user is not inconvenienced by having to hold the electronic device in a particular way in order for the electronic device to perform iris recognition.

Figure 9:
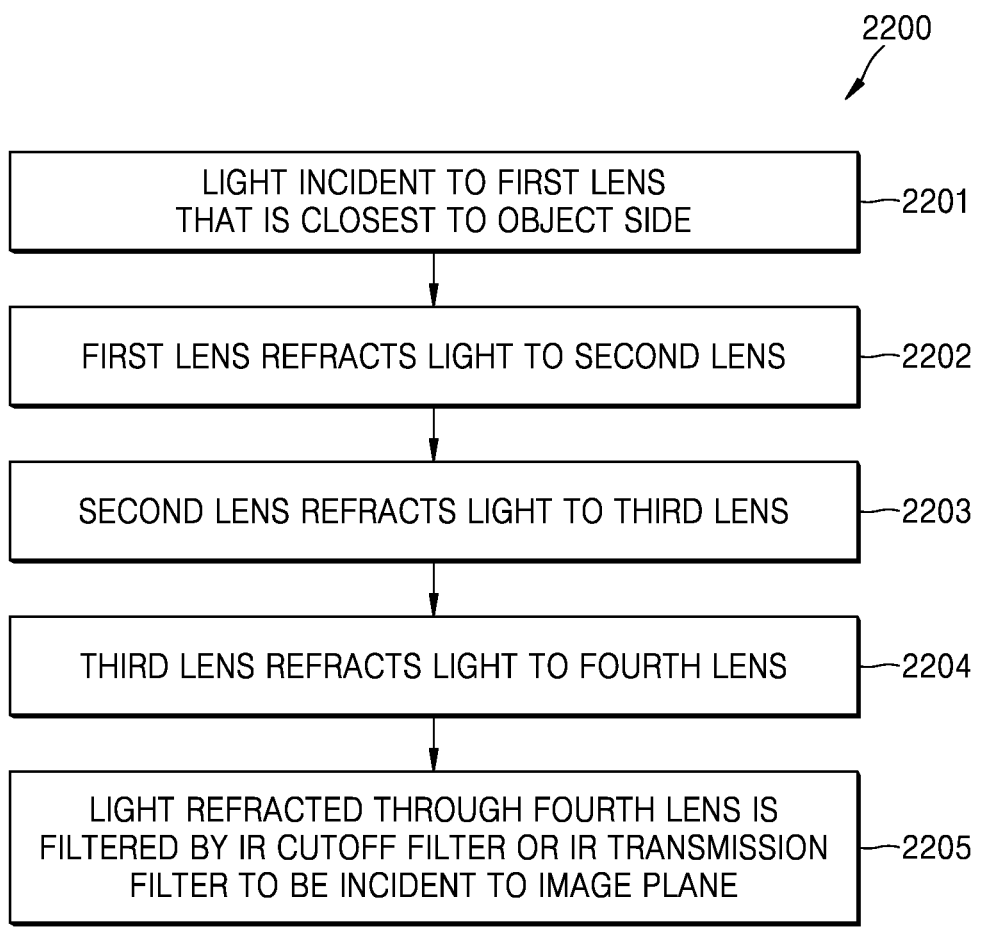
FIG. 9 is a flow chart illustrating an imaging process of an optical lens assembly according to one exemplary embodiment of the present disclosure.

FIG. 9 is a flowchart (2200) of a method for capturing images using the optical lens assemblies 100-1, 100-2, 100-3, and 100-5 illustrated with reference to FIGS. 1, 3, and 5.

According to an exemplary embodiment, in operation 2201, light is incident to the first lens L1-1, L1-2, or L1-3 closest to the object side in the optical lens assembly 100-1, 100-2, or 100-3.

In operation 2202, the first lens L1-1, L1-2, or L1-3 may refract light to a second lens L2-1, L2-2, or L2-3.

In operation 2203, the second lens L2-1, L2-2, or L2-3 may refract the light to a third lens L3-1, L3-2, or L3-3.

In operation 2204, the third lens L3-1, L3-2, or L3-3 may refract the light to a fourth lens L4-1, L4-2, or L4-3.

In operation 2205, for example, the light refracted from the fourth lens L4-1, L4-2, or L4-3 may be filtered by the IR cut-off filter or the IR transmission filter. The filtered light may then be incident to the image plane.

For example, the electronic device including the optical lens assembly as disclosed may capture images by using the light received by the image sensor. For example, an image may be captured by using an image sensor 110 of a camera module (e.g., a camera module 225 of FIG. 10 or a camera module 391 of FIG. 11) included in the electronic device.

An electronic device 201 in a network environment 200 according to one exemplary embodiments will be described below with reference to FIG. 10. The electronic device 201 may include a bus 210, a processor 220, a camera module 225, a memory 230, an input/output interface 250, a display 260, and a communication interface 270. In some embodiments, the electronic device 201 may omit at least one of the components, or may further include an additional component.

The bus 210 may include, for example, a circuit connecting the components (210 to 270) to one another and transmitting communication (e.g., a control message and/or data) among the components.

The processor 220 may include at least one of a central processing unit (CPU), an application processor (AP), and a communication processor (CP). The processor 220 may execute, for example, calculations or data processing about controlling and/or communicating among at least one another component in the electronic device 201.

The camera module 225 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various example embodiments may be applied to the camera module 225.

The memory 230 may include a volatile and/or non-volatile memory. The memory 230 may store, for example, instructions or data regarding at least one another component in the electronic device 201. According to one example embodiment, the memory 230 may store software and/or a program 240. The program 240 may include, for example, a kernel 241, middleware 243, an application programming interface (API) 245, and/or an application program (or "application") 247, etc. At least some of the kernel 241, the middleware 243, or the API 245 may be referred to as an operating system (OS).

The kernel 241 may control or manage system resources (e.g., the bus 210, the processor 220, the memory 230, etc.) used to execute operations or functions implemented in other programs (e.g., the middleware 243, the API 245, or the application program 247). Also, the kernel 241 may provide an interface capable of controlling or managing the system resources, by accessing individual component of the electronic device 201 from the middleware 243, the API 245, or the application program 247.

The middleware 243 may perform mediation function so that, for example, the API 245 or the application program 247 may communicate with the kernel 241 and exchange data.

In addition, the middleware 243 may process one or more operation requests transmitted from the application program 247 according to a priority order. For example, the middleware 143 may grant to at least one of the application program 247 a priority order of using the system resources (e.g., the bus 210, the processor 220, or the memory 230) of the electronic device 201. For example, the middleware 243 processes the one or more operation requests according to the priority order granted to the at least one application program 247, thereby performing scheduling or load balancing of the one or more operation requests.

The API 245 is, for example, an interface for the application 247 to control the functions provided by the kernel 241 or the middleware 243, and may include at least one interface or function (e.g., instruction), for example, for file control, window control, image processing, or text control.

The input/output interface 250 may function as, for example, an interface capable of transmitting instruction or data input from the user or another external device to the other component(s) of the electronic device 201. In addition, the input/output interface 250 may output instruction or data transmitted from the other component(s) of the electronic device 201 to the user or another external device.

The display 260 may include, for example, a liquid crystal display (LCD), a light-emitting diode (LED) display, an organic light-emitting diode (OLED) display, a microelectromechanical systems (MEMS) display, or an electronic paper display. The display 260 may display, for example, various pieces of content (e.g., text, images, videos, icons, or symbols) to the user. The display 260 may include a touch screen, and may receive, for example, a touch input, a gesture input, a proximity input, or a hovering input via an electronic pen or a part of a body of the user.

The communication interface 270 may set communications between, for example, the electronic device 201 and an external device (e.g., a first external electronic device 202, a second external electronic device 204, or a server 206). For example, the communication interface 270 is connected to a network 262 via wireless communication or wires communication to communicate with an external device (e.g., the second external electronic device 204 or the server 206).

The wireless communication may use a cellular communication protocol, for example, at least one of long-term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM). Also, the wireless communication may include, for example, near distance communication 264. The near distance communication 264 may include, for example, at least one of wireless fidelity (WiFi), Bluetooth, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global satellite-based navigation system, according to used region or bandwidth. Hereinafter, in the present specification, GPS and GNSS may be interchangeably used. The wires communication may include, for example, at least one of universal serial bus (USB), high definition multimedia interface (HDMI), recommended standard-232 (RS-232), and plain old telephone service (POTS). The network 262 may include telecommunications network, for example, at least one of computer network (e.g., LAN or WAN), Internet, and telephone network.

The first and second external electronic devices 202 and 204 may each be a device of the same kind as or different from the electronic device 201. According to one embodiment, the server 206 may include a group of one or more servers. According to various example embodiments, all or some of operations performed in the electronic device 201 may be executed in one or more other electronic devices (e.g., the external electronic devices 202 and 204), or the server 206. According to one example embodiment, in a case where the electronic device 201 has to perform a certain function or service automatically or upon request, the electronic device 201 may request another device (e.g., the external electronic devices 202 and 204, or the server 206) to perform at least some functions related to the certain function or service, instead of or additionally to the executing of the certain function or service on its own. The electronic device (e.g., the external electronic device 202 and 204, or the server 206) may execute requested function or the additional function, and may transfer a result of execution to the electronic device 201. The electronic device 201 may provide requested function or service after processing or without processing the result. To do this, for example, a cloud computing, a distributed computing, or a client-server computing technique.

Figure 10:
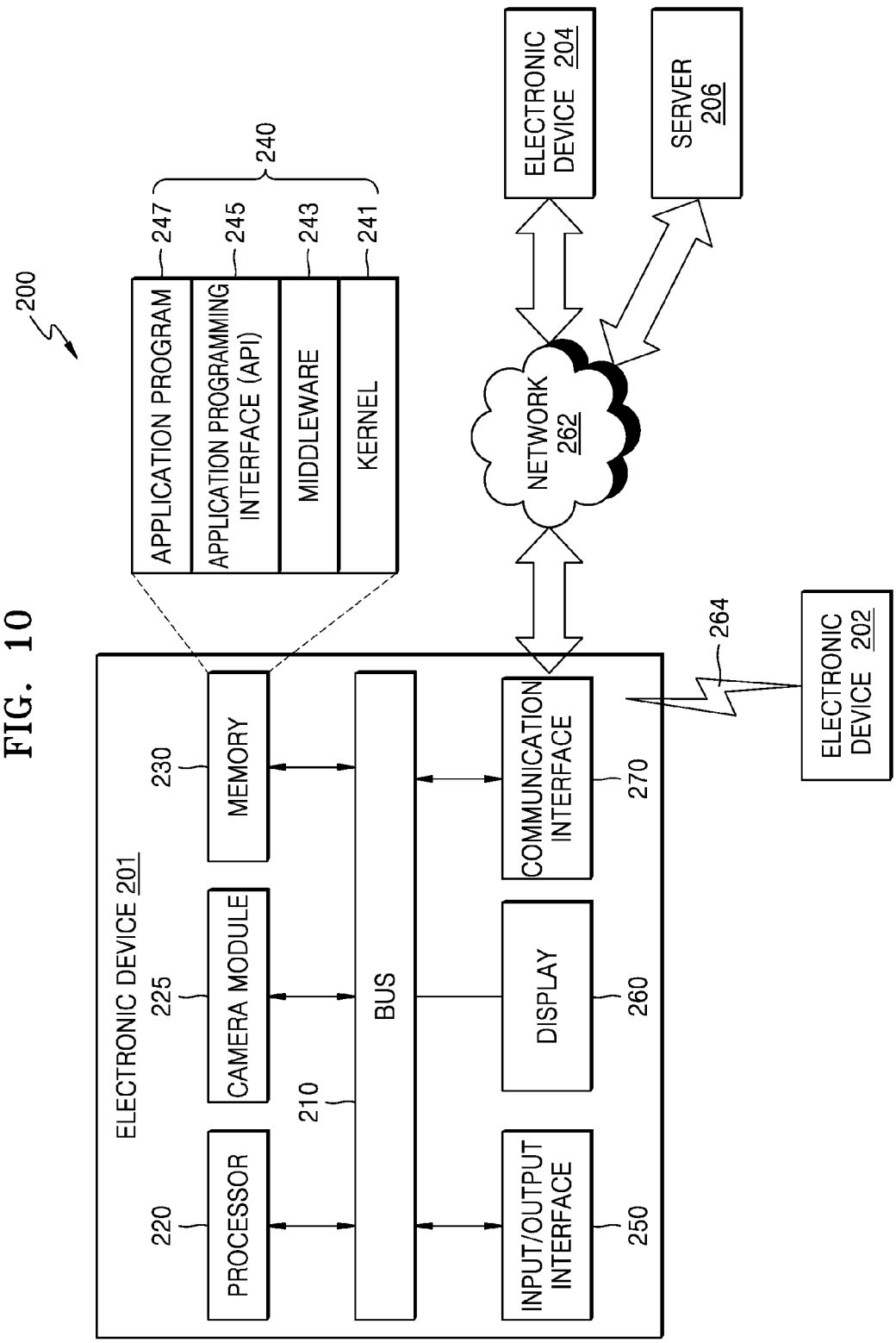
FIG. 10 is a diagram of a network environment according to one exemplary embodiment of the present disclosure.
Figure 11:
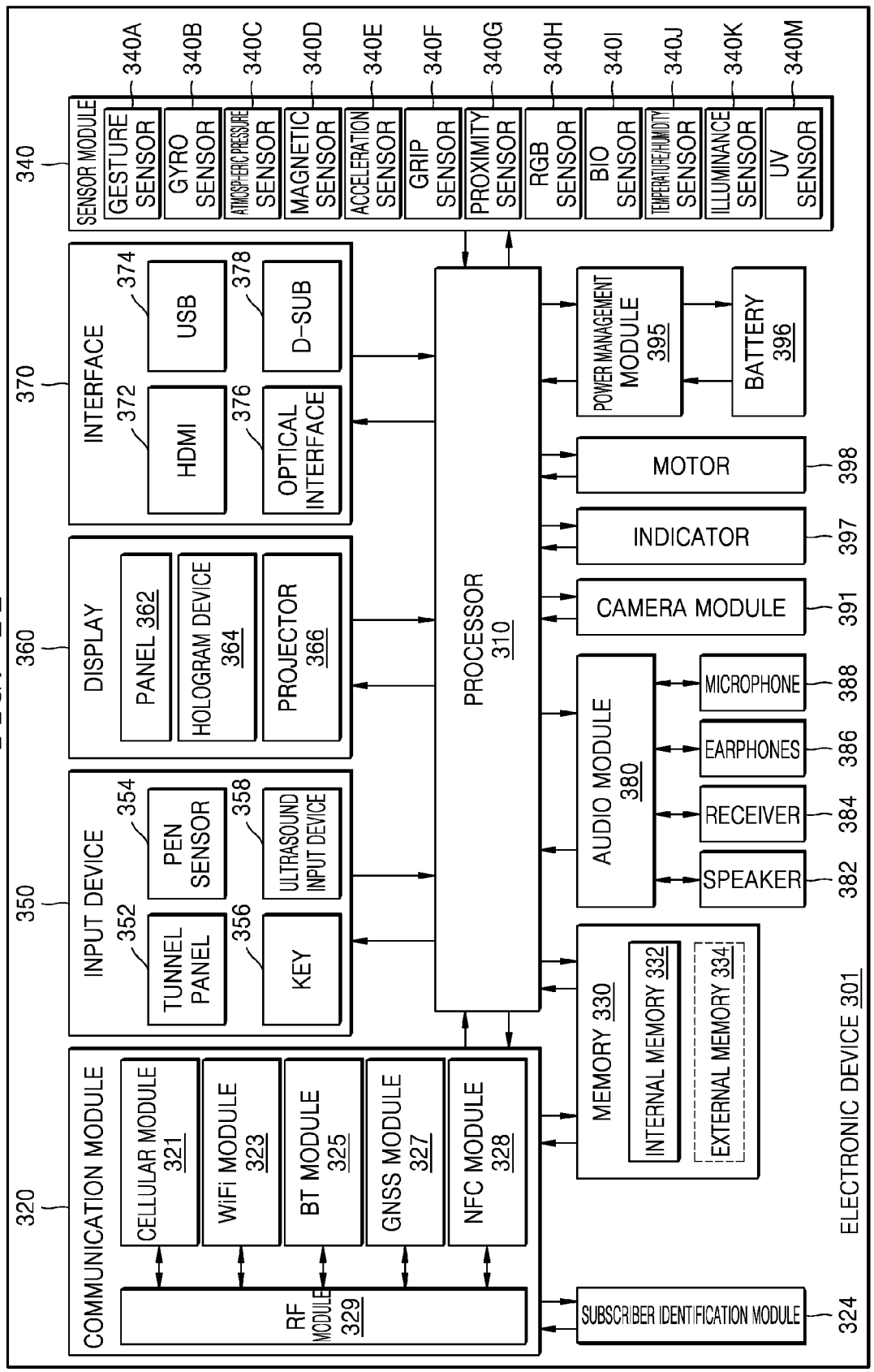
FIG. 11 is a block diagram of an electronic apparatus according to one exemplary embodiment of the present disclosure.

FIG. 11 is a block diagram of an electronic device 301 according to one exemplary embodiment of the present disclosure. The electronic device 301 may include, for example, whole or some parts of the electronic device 201 illustrated in FIG. 10. The electronic device 301 may include one or more processors (e.g., an application processor (AP)) 310, a communication module 320 (a subscriber identification module 324), a memory 330, a sensor module 340, an input device 350, a display 360, an interface 370, an audio module 380, a camera module 391, a power management module 395, a battery 396, an indicator 397, and a motor 398.

The processor 310 may drive, for example, an operating system or an application program to control a plurality of hardware or software components connected to the processor 310, and may perform various data processing and calculation. The processor 310 may be implemented as, for example, a system on chip (SOC). According to one example embodiment, the processor 310 may further include a graphic processing unit (GPU) and/or an image signal processor. The processor 310 may include at least some (e.g., a cellular module 321) of the components illustrated in FIG. 11. The processor 310 may load the instruction or data transmitted from at least one of the other components (e.g., non-volatile memory) on a volatile memory to process the instruction or data, and may store various data in the non-volatile memory.

The communication module 320 may have a structure that is the same as or similar to that of the communication interface 270 of FIG. 10. The communication module 320 may include, for example, a cellular module 321, a WiFi module 323, a Bluetooth module 325, a GNSS module 327 (e.g., a GPS module, a Glonass module, a Beidou module, or a Galileo module), an NFC module 328, and a radio frequency (RF) module 329.

The cellular module 321 may provide, for example, voice call service, video call service, text message service, or Internet service via a communication network. According to one example embodiment, the cellular module 321 may perform discrimination and authentication of the electronic device 301 within the communication network by using the subscriber identification module (e.g., a SIM card) 324. According to one example embodiment, the cellular module 321 may perform at least some of the functions that may be provided by the processor 310. According to one example embodiment, the cellular module 321 may include a communication processor (CP).

Each of the WiFi module 323, the Bluetooth module 325, the GNSS module 327, and the NFC module 328 may include a processor for processing data transmitted/received through the corresponding module. According to one example embodiment, at least some (e.g., two or more) of the cellular module 321, the WiFi module 323, the Bluetooth module 325, the GNSS module 327, and the NFC module 328 may be included in one integrated chip (IC) or an IC package.

The RF module 329 may transmit/receive, for example, a communication signal (e.g., an RF signal). The RF module 329 may include, for example, a transceiver, a power amp module (PAM), a frequency filter, a low noise amplifier (LNA), or an antenna. According to another example embodiment, at least one of the cellular module 221, the WiFi module 323, the Bluetooth module 325, the GNSS module 327, and the NFC module 328 may transmit/receive an RF signal via an additional RF module.

The subscriber identification module 324 may include, for example, a card including the subscriber identification module and/or an embedded SIM, and may include unique identification information (e.g., integrated circuit card identifier (ICCID)) or subscriber information (E.g., international mobile subscriber identity (IMSI)).

The memory 330 may include, for example, an internal memory 332 or an external memory 334. The internal memory 332 may include, for example, at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), an erasable and programmable ROM (EPROM), an electrically erasable and programmable ROM (EEPROM), a mask ROM, a flash ROM, a flash memory (e.g., NAND flash, NOR flash, etc.), hard drive, or solid state drive (SSD).

The external memory 334 may further include a flash drive, for example, a compact flash (CF), secure digital (SD), micro-SD, Mini-SD, extreme digital (xD), a multi-media card (MMD), a memory stick, etc. The external memory 334 may be functionally and/or physically connected to the electronic device 301 via various interfaces.

The sensor module 340 may measure a physical amount or sense an operating state of the electronic device 301, so as to convert measured or sensed information into an electric signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a bio sensor 340I, a temperature/humidity sensor 340J, an illuminance sensor 340K, and an ultra violet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may include a control circuit for controlling at least one sensor included therein. In some embodiments, the electronic device 301 may further include a processor configured to control the sensor module 340 as a part of the processor 310 or separately, so as to control the sensor module 340 while the processor 310 is in a sleep state.

The input device 350 may include, for example, a touch panel 352, a (digital) pen sensor 354, a key 356, or an ultrasonic input device 358. The touch panel 352 may use at least one of, for example, a capacitive type, a pressure sensitive type, an IR type, and an ultrasound type touch screen. Also, the touch panel 352 may further include a control circuit. The touch panel 352 may further include a tactile layer to provide a user with a tactile reaction.

The (digital) pen sensor 354 may be, for example, a part of the touch panel 352, or may include an additional recognition sheet. The key 356 may include, for example, a physical button, an optical key, or a keypad. The ultrasound input device 358 may sense ultrasound wave generated from an input device via a microphone (e.g., a microphone 388) to identify data corresponding to the ultrasound wave.

The display 360 (e.g., the display 360) may include a panel 362, a hologram device 364, or a projector 366. The panel 362 may have a structure that is the same as or similar to that of the display 260 shown in FIG. 10. The panel 362 may be configured to be, for example, flexible, transparent, or wearable. The panel 362 may be configured as one module with the touch panel 352. According to one example embodiment, the panel 362 may include a pressure sensor (or a force sensor) capable of measuring an intensity of a pressure from a touch of the user. The pressure sensor may be provided integrally with the touch panel 352, or may be provided as one or more additional sensors separately from the touch panel 352. The hologram device 364 may show a stereoscopic image in the air by using interference of light. The projector 366 may display images by projecting light onto a screen. The screen may be located, for example, inside or outside the electronic device 301. According to one example embodiment, the display 360 may further include a control circuit for controlling the panel 362, the hologram device 364, or the projector 366.

The interface 370 may include, for example, an HDMI 372, a universal serial bus (USB) 374, an optical interface 376, or a D-subminiature (D-sub) 378. The interface 370 may be included, for example, in the communication interface 370 shown in FIG. 11. Additionally or alternatively, the interface 370 may include, for example, a mobile high-definition link (MHL) interface, a secure digital (SD) card/multi-media card (MMC) interface, or infrared data association (IrDA) standard interface.

The audio module 380 may bi-directionally convert sound and electric signals to each other. At least some of components of the audio module 380 may be included in, for example, an input/output interface 250 shown in FIG. 10. The audio module 380 may process sound information input or output through, for example, a speaker 382, a receiver 384, earphones 386, or a microphone 388.

The camera module 391 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various example embodiments may be applied to the camera module 391.

The power management module 395 may manage power of the electronic device 301. The electronic device 301 may be an electronic device receiving power supply from a battery, but is not limited thereto. According to one example embodiment, the power management module 395 may include a power management integrated circuit (PMIC), a charger IC, or a battery or fuel gauge. The PMIC may be charged through wires and/or wirelessly. The wireless charging method may include, for example, a magnetic resonance method, a magnetic induction method, or an electromagnetic wave method, and an additional circuit for wireless charging, for example, a coil loop, a resonant circuit, or a rectifier may be further provided. The battery gauge may measure, for example, a remaining capacity of the battery 396, a voltage, a current, or a temperature during the charging. The battery 396 may include, for example, a rechargeable battery and/or a solar battery.

The indicator 397 may display a certain state of the electronic device 301 or a part of the electronic device 301 (e.g., the processor 310), for example, a booting state, a message state, or a charging state. The motor 398 may convert an electric signal into mechanical vibration, and may generate vibration effect or haptic effect. Although not shown in the drawing, the electronic device 301 may include a processing device (e.g., GPU) for supporting mobile TV function. The processing device for supporting the mobile TV may process media data according to standard such as digital multimedia broadcasting (DMB), digital video broadcasting (DVB), or mediaFlo™.

The optical lens assembly according to one exemplary embodiment includes a first lens having a negative refractive power, a second lens having a positive refractive power, a third lens having a negative refractive power, and a last lens having a negative refractive power. The first lens, the second lens, the third lens, and the last lens may be sequentially arranged from an object side to an image side of an optical axis, the object side facing an object for image capture and the image side facing an image plane of an image sensor. The optical lens assembly may satisfy following conditions:

$f/EPD<1.8$ $CT3/OAL<0.055$ $LLS/OAL>0.2$

Here, EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on an image side surface of the last lens to the image plane IMG, wherein the point is a point on the image side surface closest to the image plane IMG.

For example, the second lens may have an object side surface that is convex towards the object side.

For example, the third lens may have an image side surface that is concave towards the image side.

For example, a fourth lens having a positive refractive power may be further disposed between the third lens and the last lens.

For example, the fourth lens may be a meniscus lens that is concave towards the object side.

For example, the optical lens assembly may satisfy following condition:

$V4-V3>30$

Here, V3 denotes an Abbe's number of the third lens, and V4 denotes an Abbe's number of the fourth lens.

For example, the fourth lens having a positive refractive power and a fifth lens having a positive refractive power may be further disposed between the third lens and the last lens.

For example, the optical lens assembly may satisfy following Condition.

$-3<f3/f2<-1$

Here, f2 denotes a focal length of the second lens, and f3 denotes a focal length of the third lens.

For example, the optical lens assembly may satisfy following Condition.

$-2<f3/f<-0.8$

Here, f3 denotes a focal length of the third lens.

For example, the first lens may have a flat object side surface or a flat image side surface.

For example, the first lens, the second lens, the third lens, and/or the last lens may each be a double-aspherical lens.

For example, the first lens, the second lens, and/or the last lens may each be a double-aspherical lens, and the third lens may be a single-aspherical lens.

The optical lens assembly may have a flange back length ranging from 0.8 mm to 1.2 mm.

For example, an air space between the second lens and the third lens may be equal to or less than 0.1 mm.

For example, the optical lens assembly may include a replaceable IR cut-off filter and a replaceable IR transmission filter that are configured to be replaceable.

For example, the first lens may be a bi-concave lens.

An electronic device according to one exemplary embodiment may include an optical lens assembly, an image sensor receiving light focused by the optical lens assembly, and a filter transmitting the IR light. The optical lens assembly includes a first lens having a negative refractive power, a second lens having a positive refractive power, a third lens having a negative refractive power, and a last lens having a negative refractive power. The first lens, the second lens, the third lens, and the last lens may be sequentially arranged from an object side to an image side of an optical axis, the object side facing an object for image capture and the image side facing an image plane of the image sensor. The optical lens assembly may satisfy following conditions:

$f/EPD<1.8$ $CT3/OAL<0.055$ $LLS/OAL>0.2$

Here, EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on the image side surface of the last lens to the image plane IMG, wherein the point is a point on the image side surface closest to the image plane IMG.

Each of the aforementioned components of the electronic device may include one or more parts, and the names of the parts may vary depending on the type of the electronic device. The electronic device in accordance with various exemplary embodiments may include at least one of the aforementioned components, omit some of them, or include other additional components. Some of the components may be combined into an integrated entity, but the entity may perform the same functions as the components.

The term "module" used herein may refer to a unit including one of hardware, software, and firmware, or a combination thereof. The term "module" may be interchangeably used with a unit, logic, logical block, component, or circuit. The "module" may be a standalone unit or part of an integrated component. The "module" may be implemented mechanically or electronically. For example, the "module" may include at least one of application specific integrated circuit (ASIC) chips, field programmable gate arrays (FPGAs), or programmable logic arrays (PLAs) that perform some operations, which have already been known or will be developed in the future.

According to an exemplary embodiment, at least a part of the device (e.g., modules or their functions) or method (e.g., operations) may be implemented as instructions stored in a computer-readable storage medium e.g., in the form of a program module. The instructions, when executed by a processor (e.g., the processor 220 of FIG. 10, may enable the processor to carry out a corresponding function. The computer-readable storage medium may be e.g., the memory 230.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, or the like. Examples of the program instructions may include not only machine language codes but also high-level language codes which are executable by various computing means by using an interpreter. The aforementioned hardware devices may be configured to operate as one or more software modules to carry out exemplary embodiments, and vice versa. Modules or programming modules in accordance with various exemplary embodiments may include at least one or more of the aforementioned components, omit some of them, or further include other additional components. Operations performed by modules, programming modules or other components in accordance with various example embodiments may be carried out sequentially, simultaneously, repeatedly, or heuristically. Furthermore, some of the operations may be performed in a different order, or omitted, or include other additional operation(s).

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An optical lens assembly comprising:
a first lens having a negative refractive power;
a second lens having a positive refractive power;
a third lens having a negative refractive power;
a last lens having a negative refractive power; and
a fourth lens having a positive refractive power and disposed between the third lens and the last lens, wherein: the first lens, the second lens, the third lens, the fourth lens, and the last lens are sequentially arranged from an object side to an image side of an optical axis, the object side facing an object for image capture and the image side facing an image plane of an image sensor,
wherein the fourth lens is a meniscus lens that is concave towards the object side, and
the optical lens assembly satisfies following conditions:

$f/EPD<1.8$ $CT3/OAL<0.055$ $LLS/OAL>0.2,$ wherein EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on an image side surface of the last lens to the image plane, wherein the point is a point on the image side surface closest to the image plane.

2. The optical lens assembly of claim 1, wherein the second lens has an object side surface that is convex towards the object side.

3. The optical lens assembly of claim 1, wherein the third lens has an image side surface that is concave towards the image side.

4. The optical lens assembly of claim 1, wherein the optical lens assembly further satisfies following condition:

$V4-V3>30,$ where V3 denotes an Abbe's number of the third lens, and V4 denotes an Abbe's number of the fourth lens.

5. The optical lens assembly of claim 1, further comprising a fifth lens having a positive refractive power, which is disposed between the fourth lens and the last lens.

6. The optical lens assembly of claim 1, wherein the optical lens assembly further satisfies following condition:

$-3<f3/f2<-1,$ where f2 denotes a focal length of the second lens, and f3 denotes a focal length of the third lens.

7. The optical lens assembly of claim 1, wherein the optical lens assembly further satisfies following condition:

$-2<f3/f<-0.8,$ where f3 denotes a focal length of the third lens.

8. The optical lens assembly of claim 1, wherein the first lens has a flat object side surface or a flat image side surface.

9. The optical lens assembly of claim 1, wherein the first lens, the second lens, the third lens, and/or the last lens is a double-aspherical lens.

10. The optical lens assembly of claim 1, wherein the first lens, the second lens, and/or the last lens is a double-aspherical lens, and wherein the third lens is a single-aspherical lens.

11. The optical lens assembly of claim 1, wherein the optical lens assembly has a flange back length ranging from 0.8 mm to 1.2 mm.

12. The optical lens assembly of claim 1, wherein an air space between the second lens and the third lens is equal to or less than 0.1 mm.

13. The optical lens assembly of claim 1, wherein the optical lens assembly further comprises a replaceable infrared ray (IR) cut-off filter or a replaceable IR transmission filter in the optical axis.

14. The optical lens assembly of claim 1, wherein the first lens is a bi-concave lens.

15. An electronic device comprising:
an optical lens assembly;
an image sensor configured to receive light focused by the optical lens assembly; and
a filter configured to transmit an infrared ray (IR),
wherein: the optical lens assembly includes a first lens having a negative refractive power, a second lens having a positive refractive power, a third lens having a negative refractive power, a last lens having a negative refractive power, and a fourth lens having a positive refractive power and disposed between the third lens and the last lens,
the first lens, the second lens, the third lens, the fourth lens, and the last lens are sequentially arranged from an object side to an image side of an optical axis, the object side facing an object for image capture and the image side facing an image plane of the image sensor,
the fourth lens is a meniscus lens that is concave towards the object side, and
the optical lens assembly satisfies following conditions:

$f/EPD<1.8$ $CT3/OAL<0.055$ $LLS/OAL>0.2,$ wherein EPD denotes an entrance pupil diameter, f denotes a focal length of the optical lens assembly, CT3 denotes a thickness of the third lens at the optical axis, OAL denotes an entire length of the optical lens assembly, and LLS denotes a distance from a point on an image side surface of the last lens to the image plane, wherein the point is a point on the image side surface closest to the image plane.

16. The electronic device of claim 15, wherein the second lens has an object side surface that is convex towards the object side.

17. The electronic device of claim 15, wherein the third lens has an image side surface that is concave towards the image side.

* * * * *